(12) United States Patent
Battani et al.

(10) Patent No.: US 7,612,972 B2
(45) Date of Patent: Nov. 3, 2009

(54) ELECTRICAL CONTRACTOR CURRENT SENSING SYSTEM AND METHOD

(75) Inventors: Jeffery John Battani, Waterford, WI (US); Ping Soon Lee, Fox Point, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 3 days.

(21) Appl. No.: 11/240,990

(22) Filed: Sep. 30, 2005

(65) Prior Publication Data

US 2007/0076334 A1 Apr. 5, 2007

(51) Int. Cl.
*H02H 9/08* (2006.01)
*H02H 3/00* (2006.01)
*H02H 9/00* (2006.01)

(52) U.S. Cl. .............................. 361/42; 361/57; 361/63

(58) Field of Classification Search .................... 361/42, 361/57, 63
See application file for complete search history.

(56) References Cited

U.S. PATENT DOCUMENTS

| | | | | |
|---|---|---|---|---|
| 4,680,562 A | * | 7/1987 | Bratkowski et al. ............ | 335/16 |
| 5,319,167 A | * | 6/1994 | Juds et al. ....................... | 218/1 |
| 5,943,204 A | * | 8/1999 | Jones et al. .................. | 361/93.2 |
| 6,064,289 A | | 5/2000 | Wieloch et al. | |
| 6,078,489 A | * | 6/2000 | Messerli et al. ................ | 361/87 |
| 6,400,242 B1 | * | 6/2002 | Fasano et al. .................. | 335/13 |
| 6,459,557 B1 | * | 10/2002 | Haensgen et al. .......... | 361/93.2 |
| 6,738,246 B1 | * | 5/2004 | Strumpler .................. | 361/93.1 |
| 6,822,543 B1 | * | 11/2004 | Subramanian et al. ......... | 335/6 |
| 6,943,654 B2 | * | 9/2005 | Zhou et al. ................... | 335/106 |
| 7,116,538 B2 | * | 10/2006 | Haensgen et al. .......... | 361/93.1 |
| 2003/0117123 A1 | * | 6/2003 | Kimball et al. .......... | 324/76.41 |
| 2004/0036461 A1 | * | 2/2004 | Sutherland ................... | 323/355 |

FOREIGN PATENT DOCUMENTS

| | | |
|---|---|---|
| DE | 10253018 A1 | 5/2004 |
| EP | 0538658 A1 | 4/1993 |
| EP | 0889497 A | 1/1999 |
| EP | 1107274 A | 6/2001 |

\* cited by examiner

*Primary Examiner*—Fritz M. Fleming
*Assistant Examiner*—Lucy Thomas
(74) *Attorney, Agent, or Firm*—Fletcher Yoder Law; Alexander R. Kuszewski

(57) ABSTRACT

A current sensing module is provided for contactors and similar switch gear. The current sensing module is packaged so as to be capable of mounting on a line or a load side of a contactor. The current sensing module may be eliminated where current signals are not needed, but can be added to the package where monitoring and control functions may benefit from sensed current signals on either or both sides of a contactor. The current sensing module may be configured as a single or multiple-phase device, and may output either analog or digital signals to local devices or to networked devices.

13 Claims, 2 Drawing Sheets

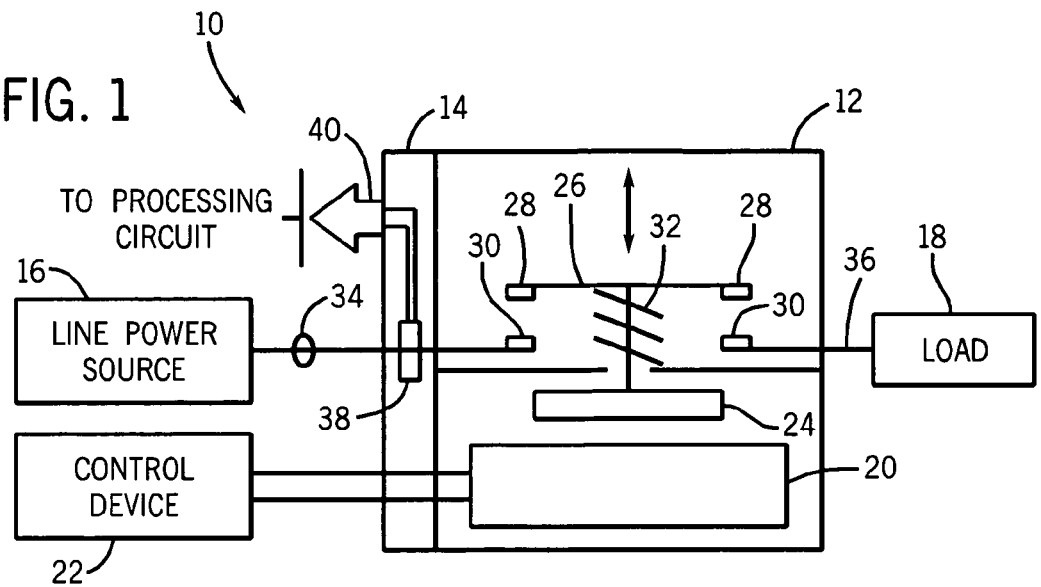
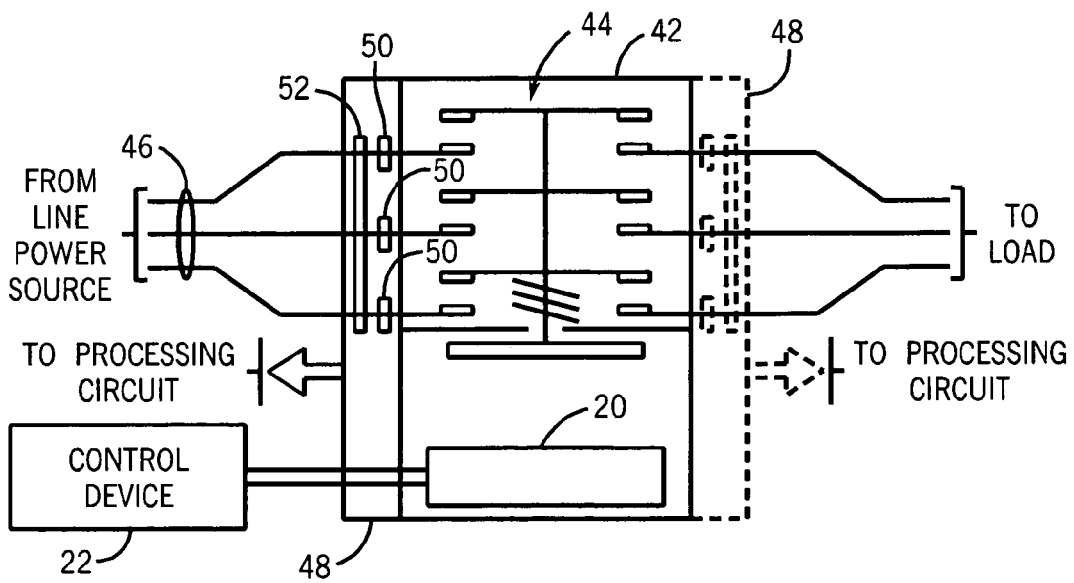

ELECTRICAL CONTRACTOR CURRENT SENSING SYSTEM AND METHOD

BACKGROUND

The present invention relates generally to switch gear and, more particularly, to a technique for obtaining current signals through power-conveying conductors routed to or from switch gear in a modular fashion.

A host of applications exist for switch gear for delivering electric power between a source and a load. In general, such switch gear includes contactors and relays of various types. The switch gear is generally placed in series with various other components, typically downstream of circuit protective components, such as fuses and circuit breakers, and upstream of components that apply the controlled power to a load. Such switch gear is used throughout industry, and in all commercial, mining, marine, and even consumer settings. In many applications, the switch gear is used to provide power for electric motors, although such loads are certainly not the only application of such switch gear.

Certain applications do or could benefit from enhanced control and monitoring functions if additional parameters were available for control circuitry, particularly parameters of electric power channeled through switch gear. For example, certain protective circuitry, such as fuses and thermal overload circuits, simply react to heating that results from high or excessive currents through the devices and conductors. For other types of control, however, an analog or digital current signal would be useful for analyzing system performance, detecting certain types of faults, predicting certain types of faults, and so forth. Where such signals have been needed, however, current sensors have typically been provided in an integrated fashion within the devices themselves. For example, relays are currently available that include integrated current sensors and logic devices that can act upon signals from the current sensors for control and monitoring. However, such integration of current sensors can add significantly to a cost of the base units, and reduces the flexibility of offering to the user devices with and without current sensing capabilities.

There is a need, in the art, for a different approach to acquisition of current signals. In particular, there is a need for a technique that can be added in a modular fashion to a contactor so as to acquire current signals when desired, but which may be eliminated if not needed. There is also a need for a current sensing module for contactors that can be applied to either the line or the load side of a contactor, and that provides the possibility for integration with other input/output (I/O) elements and networks.

BRIEF DESCRIPTION

The present invention provides a novel approach to the acquisition of current signals designed to respond to such needs. The technique is based upon the construction of a single or multiple-phase current sensing module that can be added to a contactor. The contactor may generally be of any suitable known type and construction. However, the contactor may conveniently be designed to facilitate either screwed-on or snap-on attachment of the current sensing module for easy integration into the contactor package. Where desired, the current sensing module may provide current sensors for one or multiple phases of power, as well as a common current sensor for multiple phases, such as for ground fault detection. The module may also be equipped for networking, either including a network card within the module itself, or for producing an analog signal that can be converted to a digitized signal for placement on a network. Thus, the module will typically include a connection for an I/O cable or network cable.

DRAWINGS

These and other features, aspects, and advantages of the present invention will become better understood when the following detailed description is read with reference to the accompanying drawings in which like characters represent like parts throughout the drawings, wherein:

FIG. 1 is a diagrammatical representation of a current-sensing contactor including a current sensing module in accordance with aspects of the present technique;

FIG. 2 is a similar diagrammatical representation of a three-phase contactor having a modular current sensing module secured thereto for sensing a current through the individual conductors and for sensing ground faults;

DETAILED DESCRIPTION

Figure 3:
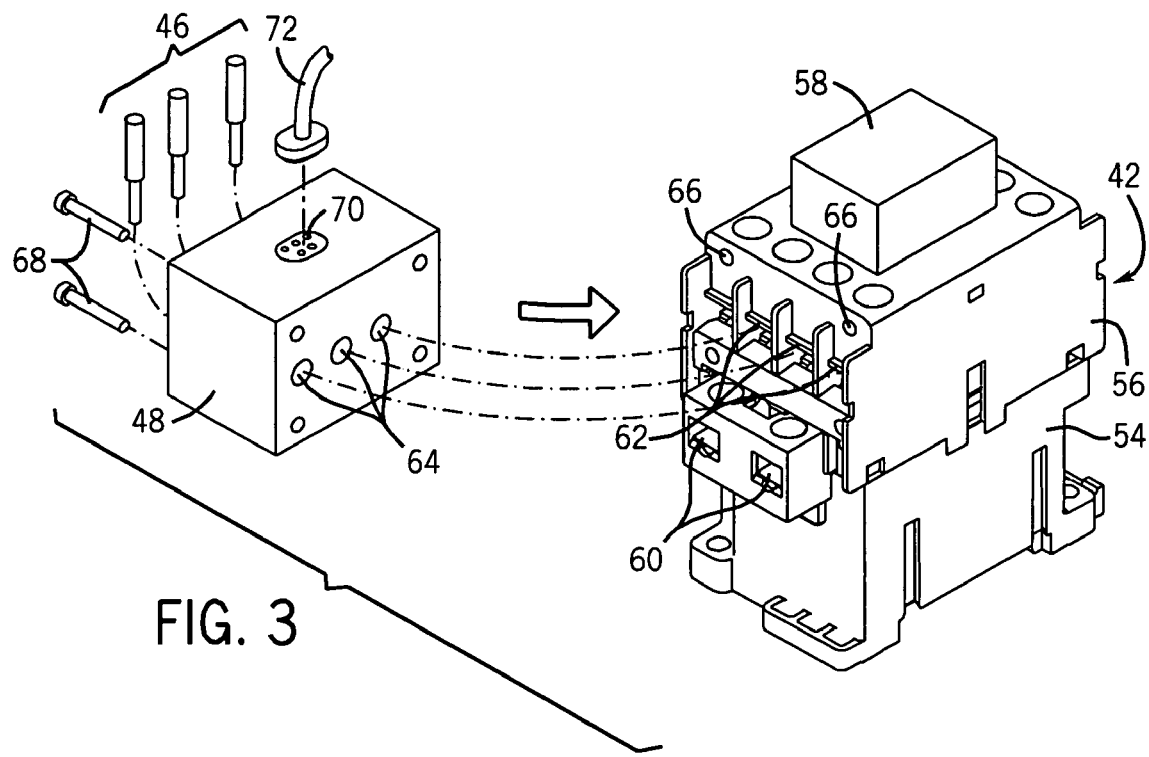
FIG. 3 is a partial exploded view of an exemplary physical configuration of a contactor and current sensing module of the type that may be used to sense current through multiple conductors as illustrated in FIG. 2.

Turning now to the drawings, and referring first to FIG. 1, a current sensing contactor 10 is illustrated generally as including a contactor 12 and a current sensing module 14. The contactor is electrically coupled between a line power source 16 and a load 18. As will be appreciated by those skilled in the art, many such applications exist for such contactors, and the present invention is not intended to be limited to any particular application. For example, the line power source 16 may include a direct connection to a power grid, or may be a dc source such as a battery. Moreover, the line power source 16 may include circuitry for conditioning signals applied to the contactor, such as various power conversion circuits, inverter circuits, and so forth. Also, the line power source 16 will typically include, in an actual application, a range of additional components, such as fuses, circuit breakers, thermal overloads, safety contactors, and so forth. Similarly, load 18 may include any suitable load, including moving and non-moving loads, actuators, electric motors, and so forth.

The contactor 12 may have any known physical and electromagnetic configuration. In the illustrated embodiment, the contactor includes an operator coil 20 that will be associated with a core or armature (not shown) to generate an electromagnetic field when a control signal is applied to it by a control device 22. The control device 22 may include mechanical or solid state switches, or any other circuit capable of delivering an ac or dc control signal for energization of the coil 20. The contactor further includes a moveable structure including an armature 24 and a spanner or bridge 26. The armature and spanner are moveable as a unit, and the spanner holds moveable contacts 28. The moveable contacts 28 are mounted in mutually facing relation with stationary contacts 30. The entire moveable assembly is biased in an open position by a spring or other biasing element 32. Upon energization of the coil 20, the armature 24 is attracted to the coil by Lorentz forces owing to the flux produced by coil, moving the assembly to compress spring 32 and bring contacts 28 into physical contact with stationary contacts 30. A current-carrying path is thus completed through the device from contacts 30 to contacts 28 and through the spanner 26. The device may then be opened by de-energizing the coil 20 after which the biasing spring 32 will open the contacts and interrupt the current carrying path.

Terminals are provided on either side of the contactor for channeling the power from the line power source to the load. In the illustrated embodiment, a line conductor 34 is coupled to the contactor through the current sensing module 14, while a load conductor 36 is coupled to the contactor between the contactor and the load. In a presently contemplated embodiment, the current sensing module 14 is designed for placement either on the line side of the contactor or on the load side. That is, the current sensing module may receive either the line side conductor 34 or the load side conductor 36 and sense current therethrough during operation of the device.

The current sensing module itself includes a current sensor 38 that is either positioned adjacent to or around the conductor leading power to or from the contactor. Various types of current sensors may be used in the device. For example, conventional current sensing devices that may be employed in the module may include Rogowski coils, current-sensing PC board-mounted devices, laminated board-type windings, Hall effect sensors, and so forth. Moreover, the module may employ current sensors of the type described in U.S. Pat. No. 6,943,537, issued to Blakely on Sep. 13, 2005 and entitled Magnetic Flux Sensor and Method, which is hereby incorporated herein by reference. Where required, power for operation of the current sensor may be drawn from the line conductor itself, or from the control device 22. Power may also be provided, where needed, from a network connector as described below, where such network connectors provide ac or dc power. Networks that provide such power for certain low-level controls include the industrial network generally referred to as DeviceNet.

Signals produced by the current sensor are extracted from the current sensor for use in other circuitry. The output signal is represented generally by the arrow 40 in FIG. 1. As will be appreciated by those skilled in the art, and as described in greater detail below, such current signals may be used for the control of the contactor 12 itself. However, a wide range of other applications exist for control algorithms and monitoring algorithms based upon such current signals. Where no such monitoring or control functions are needed, the module 14 may simply be eliminated from the contactor package. However, where decisions and reporting functions may be based upon the current signals, the output signal 40 may be channeled to other devices, such as analog-to-digital converters, I/O interfaces, programmable logic controllers, and so forth.

FIG. 2 is a diagrammatical representation of an alternative arrangement for a current-sensing contactor specifically designed for three-phase applications. In the diagrammatical representation, the contactor, here referred to by reference numeral 42, has similar construction to that described above, including a coil 20 energized by a control device 22. The spanner assembly 44, however, includes spanners or contact bridges for multiple phases. That is, multiple current-carrying paths are completed through the device upon energization of the coil 20. Line conductors 46, then, include three-phase conductors for providing all three phases of electrical power to the contactor at respective stationary contacts. Upon energization of coil 20, the spanner assembly 44 is displaced to complete current-carrying paths through the individual stationary contacts, moveable contacts, and spanners.

As will be appreciated by those skilled in the art, the contactors illustrated in FIGS. 1 and 2 are of a type including a pair of stationary contacts and a pair of moveable contacts. Variations, of course, exist on these designs, including contactors the have a pivoting movable assembly and a single movable contact, as well as contactors having multiple moveable contacts per phase (e.g., for making and breaking contact in desired manners). The present modular current sensing approach may be used with any of these conventional contactors. Moreover, the approach is not intended to be limited to any particular electrical component that is strictly defined as a "contactor." That is, current interrupting devices in general, including relays, circuit breakers and so forth may benefit from the present techniques.

The current sensing module 48 illustrated in FIG. 2 includes multiple current sensors 50. In practice, the module may include as little as a single current sensor, but for certain applications will include two or three current sensors for each phase of electrical power. As will be appreciated by those skilled in the art, the provision of multiple current sensors permits evaluation of the various phase conditions within and between the conductors, such as to evaluate phase-to-phase shorts, loss of a phase, and so forth. Moreover, in the illustrated embodiment, the current sensing module 48 includes a ground fault sensor 52 which senses current through multiple conductors. In practice, the ground fault sensor may sense current through all three conductors, although other approaches may detect signals through fewer than all of the conductors. Imbalances, then, due to ground faults may be detected by reference to the output signals.

Also illustrated in FIG. 2 is a current sensing module 48 on a load side of the contactor 42. As noted above, in presently contemplated configuration, to enhance the flexibility of the system, the current sensing module may be packaged so as to permit attachment to either the line side or the load side of the contactor. In practice, it may be preferable to sense current upstream of the contactor or downstream of the contactor, or both.

FIG. 3 illustrates an exemplary physical configuration for a contactor and a current sensing module package of the type illustrated in FIG. 2. As noted above, any suitable contactor configuration may be employed. In the embodiment illustrated in FIG. 3, the three-phase contactor 42 has an operator section 54 and a contact section 56 fitted to the operator section. The operator coil described above is situated in the operator section 54 along with its core and any associated terminals, and so forth. The armature described above extends from the contact section 56 into the operator section 54, and is moveable with the moveable contacts within the contact section 56 as described above. In the embodiment illustrated, an auxiliary contact 58 is provided atop the contact section 56 to provide an indication of the physical position of the moveable contact structure.

The operator section 54 has control terminals 60 to which control signal conductors are coupled (not shown) when the contactor is placed in operation. As noted above, the control signals may be either ac or dc signals, depending upon the contactor design, and generally provide the current required to produce the flux that shifts the contactor between its logical states. Similarly, line terminals 62 are provided for receiving incoming line conductors 46. Similar terminals are provided on the opposite end or side of the contactor for load conductors (not shown).

The current sensing module 48 in the illustrated embodiment is designed for attachment to the load or the line side of the contactor 42. The module includes passages 64 through which the line conductors 46 are passed as they are secured to the line terminals 62 during installation of the contactor. The current sensors described above are housed within the module. The current sensing module 48 may be designed for snap-on attachment to the contactor package, or for attachment by any other means. In the illustrated embodiment, for example, lugs 66 are provided on the contactor for receiving bolts or screws 68 that firmly secure the current sensing module to the contactor during installation.

As noted above, current signals from the current sensing module will typically be extracted for use by other devices, including locally-disposed devices, but also networked devices, where appropriate. Accordingly, output signals may be conditioned by analog-to-digital converters within the module, and these signals may also be encrypted or encoded for application to a network via any suitable network protocol. Where analog signals are output by the module, these will be typically be provided to an I/O interface (not shown) for use in other processing devices. In the embodiment illustrated in FIG. 3, for example, a network receptacle 70 is provided for receiving a multi-pin network cable 72. The network cable 72 may also provide power to the module, and serves to deliver current signals to external devices, such as the I/O interface and network components.

Figure 4:
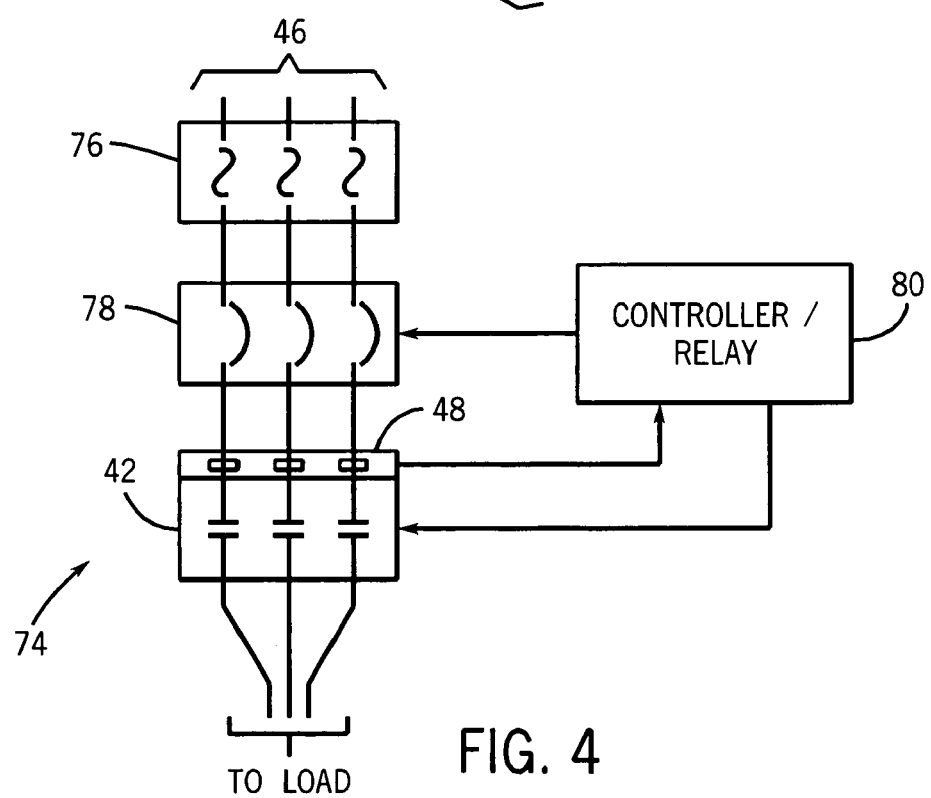
FIG. 4 is a diagrammatical representation of an exemplary implementation of a current sensing module in a power circuit for applying power to a load.

As noted above, the signals output by the current sensing modules may be used for various purposes. As shown in FIG. 4, the contactor 42 and current sensing module 48 may be used, for example, to control operation of upstream components, or more generally other components used to deliver power to a load. In the arrangement illustrated in FIG. 4, a power circuit 74 includes a series of fuses 76 and a thermal overload 78. The contactor 42 and its associated current sensing module 48 are electrically in series between the thermal overload device 78 and the load. The contactor itself may be controlled by a controller/relay 80 for selective application and removal of power to the load. Moreover, output signals from the current sensors may be applied to the controller/relay 80 both for controlling operation of the contactor 42 and for triggering opening or closing of the thermal overload device 78. Many other uses for the output signals from the current sensing modules will be envisaged by those skilled in the art, particularly for both local and remote control of application of power to loads, and for evaluation of the proper functioning of power control circuitry.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A current sensing electrical contactor system comprising:
    a contactor assembly including a housing, moveable contacts, stationary contacts and a control coil configured to cause movement of the moveable contacts to open and close a current carrying path through the moveable and stationary contacts in response to a control signal, the contactor being only remotely operated to open and close the current carrying path;
    a current sensing module assembly mechanically coupled to an outer face of the housing wherein the current sensing module assembly includes:
        a plurality of current sensors for sensing current through at least two current carrying paths defined by the moveable and stationary contacts; and
        a ground fault sensor adapted to sense current through at least two conductors and generate a signal indicative of a ground fault; and
    a relay coupled to the current sensing module assembly and configured to apply or interrupt power upstream of the contactor in response to current sensed by the current sensing module assembly.

2. The system of claim 1, wherein the contactor assembly is a three phase contactor.

3. The system of claim 1, wherein the current sensing module assembly is configured to be physically coupled interchangeably to either a line side or a load side of the contactor assembly.

4. The system of claim 1, further comprising an analog-to-digital converter for converting current signals from the current sensing module assembly to digital values.

5. The system of claim 4, further comprising a network interface circuit for transmitting the digital values to a remote location via a network link.

6. A current sensing electrical contactor system comprising:
    a contactor assembly including a housing, moveable contacts, stationary contacts and a control coil configured to cause movement of the moveable contacts to open and close a current carrying path through the moveable and stationary contacts in response to a control signal, the contactor being only remotely operated to open and close the current carrying path;
    a modular current sensor assembly physically coupled to an outer face of the housing and including:
        a plurality of current sensors configured to sense current through at least two current carrying paths defined by the moveable and stationary contacts; and
        a ground fault sensor adapted to sense current through at least two conductors and generate a signal indicative of a ground fault; and
    a relay coupled to the modular current sensor assembly and configured to independently apply or interrupt power upstream of the contactor assembly in response to current sensed by at least one of the plurality of current sensors.

7. The system of claim 6, wherein the current sensor assembly is configured to be physically coupled interchangeably to either a line side or a load side of the contactor assembly.

8. The system of claim 6, further comprising an analog-to-digital converter for converting current signals from the current sensor to digital values.

9. The system of claim 8, further comprising a network interface circuit for transmitting the digital values to a remote location via a network link.

10. A current sensing electrical contactor system comprising:
    a modular current sensor assembly configured to be physically coupled to an outer face of a contactor assembly and including a plurality of current sensors configured to sense current through at least two current carrying paths defined by the moveable and stationary contacts;
    a ground fault sensor adapted to sense current through at least two conductors and generate a signal indicative of a ground fault; and
    a relay coupled to the modular current sensor assembly and configured to apply or interrupt power upstream of the contactor assembly in response to current sensed by the modular current sensor assembly.

11. The system of claim 10, wherein the current sensor assembly is configured to be physically coupled interchangeably to either a line side or a load side of the contactor assembly.

12. The system of claim 10, further comprising an analog-to-digital converter for converting current signals from the current sensor to digital values.

13. The system of claim 12, further comprising a network interface circuit for transmitting the digital values to a remote location via a network link.

* * * * *